UNITED STATES PATENT OFFICE.

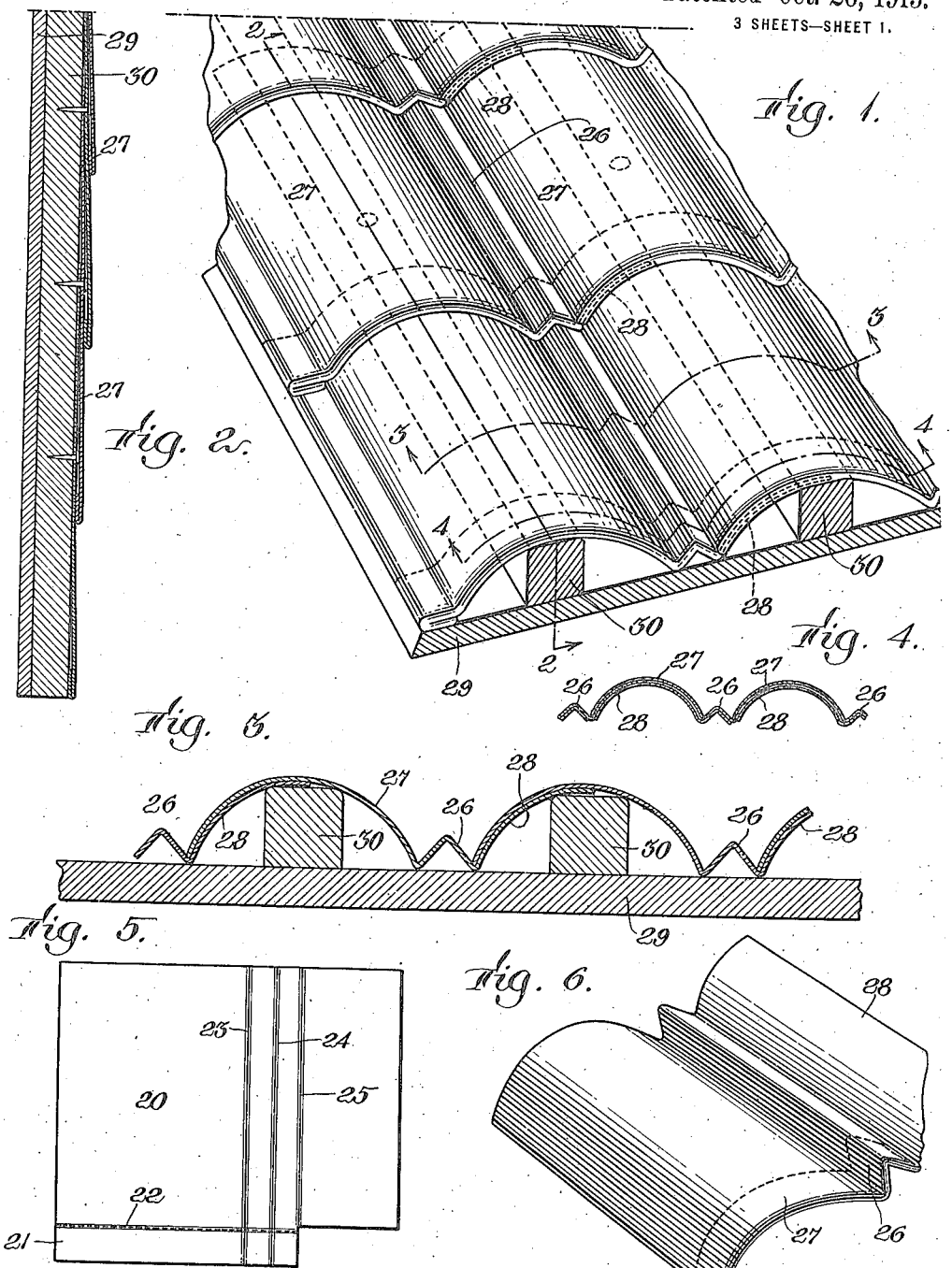

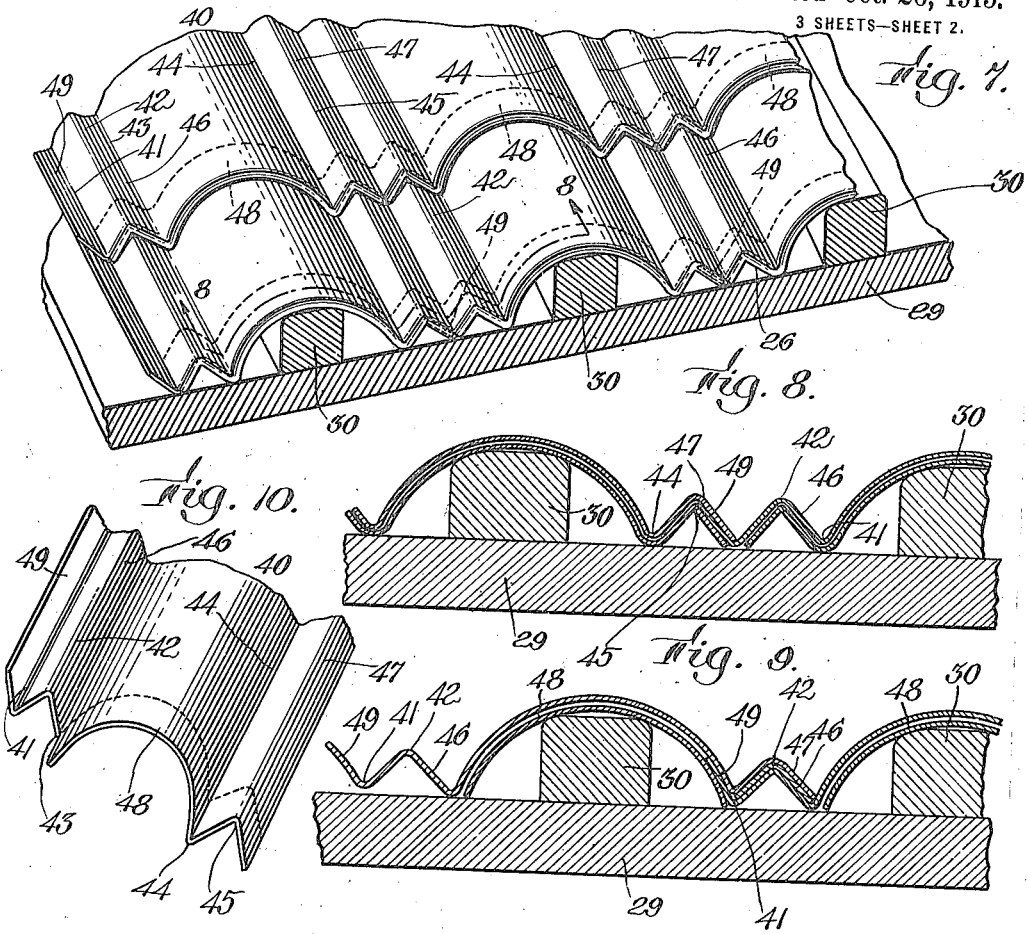

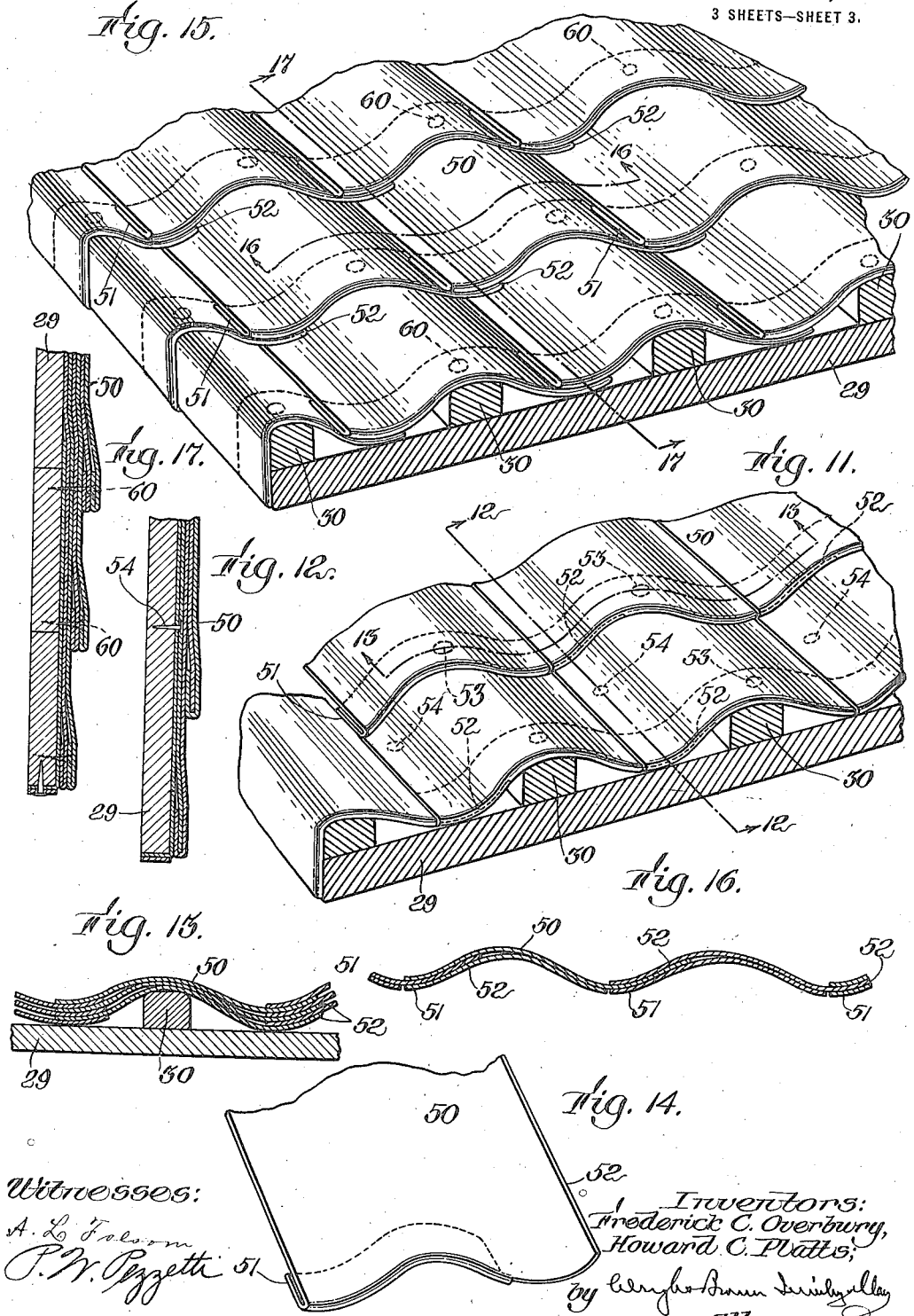

FREDERICK C. OVERBURY, OF NEW YORK, N. Y., AND HOWARD CARLETON PLATTS, OF RUTHERFORD, NEW JERSEY, ASSIGNORS TO FLINTKOTE MANUFACTURING COMPANY, OF RUTHERFORD, NEW JERSEY, A CORPORATION OF NEW JERSEY.

TILE ROOFING.

1,158,268.   Specification of Letters Patent.   Patented Oct. 26, 1915.

Application filed April 7, 1914. Serial No. 830,211.

*To all whom it may concern:*

Be it known that we, FREDERICK C. OVERBURY and HOWARD CARLETON PLATTS, of New York, in the county of New York and State of New York, and of Rutherford, in the county of Bergen and State of New Jersey, respectively, have invented certain new and useful Improvements in Tile Roofings, of which the following is a specification.

This invention has relation to roofs or roof coverings, and has for its object to provide interlocking tiles formed of flexible non-metallic weatherproof material.

On the accompanying drawings, Figure 1 illustrates a portion of a roof equipped with the invention. Fig. 2 represents a section on the line 2—2 of Fig. 1. Fig. 3 represents a transverse section on the line 3—3 of Fig. 1. Fig. 4 represents on a smaller scale, a section on the line 4—4 of Fig. 1. Fig. 5 represents a tile blank. Fig. 6 represents a shaped tile. Fig. 7 represents a roof equipped with another form of the invention. Fig. 8 represents a section on the line 8—8 of Fig. 7. Fig. 9 represents a transverse section through interlocking tiles having a folded lateral edge. Fig. 10 illustrates a portion of one of the tiles shown in Fig. 7. Fig. 11 illustrates a portion of a roof equipped with still another form of the invention. Fig. 12 represents a section on the line 12—12 of Fig. 11. Fig. 13 represents a transverse section on the line 13—13 of Fig. 11. Fig. 14 represents a portion of one of the tiles. Fig. 15 represents a portion of a roof equipped with another form of tile. Fig. 16 represents a transverse section on the line 16—16 of Fig. 15. Fig. 17 represents a section on the line 17—17 of Fig. 15.

The tiles are made of a flexible non-metallic weatherproof and waterproof material. Such material consists preferably of a sheet of wool felt or its equivalent, saturated or impregnated with a waterproofing composition such as a suitable hydrocarbon, and coated on one or both sides with a layer or facing of weatherproofing composition, such, for example, as an asphaltum paint, or a pitch or bitumen having a relatively high melting point, so that it will not be affected by the heat of the sun. Preferably this composition has incorporated in it some suitable inert pigment, e. g. ground hematite ore, which will impart a pleasing color thereto and increase its fire-resisting qualities. The material is made in long sheets and is cut into sizes and shapes proper for the tile blanks.

We have illustrated various tiles in various shapes for producing different ornamental effects when laid upon the roof. In the formation of these several tiles to secure the results to be accomplished, it is necessary to bend, fold and otherwise shape them. This cannot be done conveniently during the operation of laying the tiles, for the reason that waterproof and weatherproof material of the class described cannot be bent ordinarily without cracking and breaking the coatings or facings, especially when the weather is moderately cool. When the coatings have been treated to render them soft and plastic, the material may be folded or bent at a sharp angle to stretch and elongate the coating at the bend or fold, and, if then caused to set or harden in the stretched condition, the coatings will not break when the folded portion is bent back and forth about the hinge thus formed.

In Fig. 5, we have shown a tile blank formed of the described material. Its main body portion is substantially rectangular in outline, as at 20, and it has at its lower portion a tab 21 which is folded under on the line 22 to form a thick edge portion. By suitable apparatus, the blank is bent on the lines 23, 24 and 25 to form an upstanding rib 26 and to provide two curved side portions or wings 27, 28. That at 27 is shown as considerably wider than that at 28 but that is not a material feature. The folded-under lower marginal portion 21 forms with the side portion 27 of the body a pocket or recess to receive the wing or side portion 28 of the next adjacent tile, so as to interlock the two tiles together and produce a practically continuous exposed edge along a horizontal row of tiles.

The tiles are laid in horizontal rows, the higher row overlapping to a considerable extent the next lower row, said tiles being likewise in vertical rows so that the ribs all register, as shown in Fig. 1.

Preferably, though not necessarily, upon the supporting structure 29 are placed parallel supporting bars 30, 30, suitably spaced apart. Then a horizontal row of tiles is laid upon the roof, so that the lower edges of the ribs rest upon the structure 20 midway between the supports 30 and the curved portions 27 bridge the supports. Each tile is interlocked with the next adjacent tile, by slipping the portion 28 in the recess formed by the folded-under portion 21 thereof, as shown in Fig. 4, so that said portion 28 is overlapped by the body portion 27 by said adjacent tile. The underlapping portion 28 serves to strengthen and support the arched rib formed by the portion 27.

The upper portions of the tiles are secured in place by nails or other fastenings, which may be located in the V-shaped recesses formed by the angular ribs, or passed through the arched support or curved ribs into the bars 30. When the next row of tiles is laid, the lower portions of the latter cover and conceal the fastenings and the holes made thereby. When the roof is complete, the folded edges of the tiles are practically continuous and are so thick as to give a semblance of solidity and rigidity to the roof. The bars 30 are unnecessary to support or maintain the contour of the arching ribs, but are employed to prevent the ribs from being crushed by anyone walking upon the roof. When laid, the roof has alternating curved or arching ribs, and angular ribs, which extend from the eaves to the ridge thereof.

In Figs. 7 to 10 inclusive, the tiles are laid with two angular ribs intervening between each pair of arching or curved ribs. In this case, the blank 40 is made wider, and its side portions are bent on the lines 41, 42, 43, 44 and 45, to provide two angular ribs 46, 47, one on each side of the arched rib 48, and an upturned lateral marginal portion 49. The lower portion of the blank is folded under, except below the rib 46, so as to receive the rib 46 and portion 49 of the next adjacent tile, as shown clearly in Figs. 7 and 8. This form of tile may be laid to provide two intervening angular ribs or ridges as shown in Fig. 8, or to provide a single intervening rib as shown in Fig. 9, this depending upon the extent to which the two tiles overlap laterally.

In Figs. 11, 12, 13, 14 and 16, we have illustrated another embodiment of the invention in which there are no intervening angular ribs, but in which the tiles laterally interlock. In this case, each tile blank 50 has at its lower end a folded-under tab 51, which is less in length than the width of the blank, and which provides a lateral portion 52 which is overlapped by the next adjacent tile, and the lower edge portion of which slips into and is interlocked in the recess formed by the tab 51 of said next adjacent tile. The roofing thus formed is sinuous, the tiles being fastened by nails 53, 54 or other fasteners to the supports 30 and to the structure 29 between the supports. In this form of roofing, the laterally overlapping portions are concave.

In Figs. 16 and 17, the sinuous tiles are not interlocked, although each tile laterally overlaps an adjacent tile. With this form, the lower fold extends entirely across the lower portion of the body of the tile, but in such case the fastening 60 is driven through the turned-under fold or tab so as to be covered by the main body of the tile. In addition to these fasteners which are passed into the supports 30, there are others, 61, which are driven through a portion of each tile that is covered by an overlapping tile of the next row, and into the supporting structure 29 to cause the sinuous tiles to retain their contour when laid.

In both forms of roofing shown in Figs. 11 and 15, there are parallel convex ribs which extend toward the ridge, although these ribs are not so pronounced as in the form of tiles previously described. In all of the forms of tiles, there are the folded-under lower edges, which overlap the tiles of the immediately adjacent lower rows, and the lateral overlap of each tile upon the next adjacent tile of the same horizontal row.

Having thus explained the nature of our said invention, and described a way of making and using the same, although without attempting to set forth all of the forms in which it may be made or all of the modes of its use, what we claim is:

1. A flexible non-metallic roofing tile consisting of a fibrous waterproof foundation coated with a weatherproof substance, said tile having a central arched or convex rib longitudinal thereof, a folded-under lower edge portion, and a side portion projecting beyond the end of said folded portion to be within the folded-under lower edge portion of the next adjacent tile.

2. A roof covering comprising a plurality of flexible non-metallic tiles coated with a weatherproof substance, said tiles being arranged in vertically overlapping transverse rows, each tile being conversely curved and having a flexibly connected folded-under lower edge portion, a lateral portion to overlap and interlock with said folded-under lower edge portion of the next adjacent tile in the same horizontal row, and fasteners passed through said folded-under portions and covered by the body portions of said tiles.

3. A flexible non-metallic roofing tile consisting of a fibrous waterproof foundation coated with a weatherproof substance, said tile having a flexibly connected folded-under lower edge portion and a side portion projecting laterally beyond the lower edge portion, said blank having a central arched portion, and angularly bent side portions to form ribs, and being adapted to be expanded and contracted laterally to vary the angularity of said ribs and the curvature of said central portion.

4. A roof comprising a supporting structure, a plurality of parallel bars thereon, and a plurality of flexible non-metallic tiles each consisting of a flexible waterproof foundation having a coating of weatherproof substance, said tiles being arranged in vertically overlapping horizontal rows, each tile bridging one of said supports, and laterally overlapping an adjacent tile, said tiles being folded under at their lower edge portions, and fasteners covered by the body portions of said tiles for securing them to said bars and to the supporting structures between said bars to produce a sinuous surface.

In testimony whereof we have affixed our signatures, in presence of two witnesses.

FREDERICK C. OVERBURY.
HOWARD CARLETON PLATTS.

Witnesses:
F. F. HOOKER,
L. B. FANGER.